United States Patent [15] 3,701,877
Richardson [45] Oct. 31, 1972

[54] METHOD AND APPARATUS FOR MAKING ELECTRICAL CONNECTIONS

[72] Inventor: Hugh H. Richardson, New Haven, Ind.
[73] Assignee: General Electric Company
[22] Filed: Dec. 20, 1971
[21] Appl. No.: 209,764

[52] U.S. Cl. ....................219/97, 219/58, 219/100
[51] Int. Cl. ................................................B23k 9/00
[58] Field of Search............................219/58, 97, 100

[56] References Cited

UNITED STATES PATENTS

| | | | |
|---|---|---|---|
| 2,766,983 | 10/1956 | Taylor | 267/1 |
| 3,523,173 | 8/1970 | Lull | 219/91 |
| 1,930,263 | 10/1933 | Burnish | 219/100 |

Primary Examiner—R. F. Staubly
Attorney—Joseph B. Forman et al.

[57] ABSTRACT

Disclosed methods include connecting at least two conductors by establishing at least one electric current conducting circuit by forming a conductor into at least one loop so that at least one pair of spaced apart portions of the conductor, separated by an intervening or intermediate portion of the conductor, are positioned adjacent to one another; relatively positioning a preselected segment of at least one other conductor and the adjacent portions of the first conductor so that the preselected segment is located between the pair of spaced apart portions; and causing electric current to flow through the at least one loop so that an arc between the pair of spaced apart portions is produced and at least two conductors are welded together by the arc. Also disclosed are methods of forming two spaced apart loops in a first conductor, and connecting the first conductor loop portions to second and third conductors respectively by an arc between pairs of portions of each loop. Also disclosed is apparatus having a conducting loop fixture and means for causing current to flow through the loop fixture so that an arc is struck between adjacent portions of the fixture to connect at least two conductors.

10 Claims, 5 Drawing Figures

PATENTED OCT 31 1972

INVENTOR:
HUGH H. RICHARDSON,
BY Ralph E. Kisher Jr.
ATTORNEY.

PATENTED OCT 31 1972

INVENTOR:
HUGH H. RICHARDSON,
BY Ralph E. Krisher Jr.
ATTORNEY.

METHOD AND APPARATUS FOR MAKING ELECTRICAL CONNECTIONS

BACKGROUND OF THE INVENTION

The present invention relates to methods and apparatus for making an electrical connection between two electrical conductors by welding.

In one approach used heretofore to connect external lead wires to insulated wire conductors, e.g., magnet wire conductors used as the windings of electromagnetic devices (e.g., motors, transformers, relays, etc.), the ends of the external lead wire and wire conductors have been mechanically crimped together to form an electrical connection. However, such crimped connections frequently are mechanically weak, especially at elevated temperatures, e.g., above 135° C., and often will separate when subjected to mechanical stresses caused by vibrations or when the wire conductors and lead wires are subjected to forces tending to pull them apart. Furthermore, such connections tend to relax with age, and oxide may form on adjacent conductor surfaces, thereby providing a poor electrical connection.

Connections between electrical conductors using conventional low cost solder are generally not reliable at high currents or high ambient temperatures, since such solder has a relatively low melting temperature. Spot welding techniques have also been used to make electrical connections of long term reliability between conductive members. However, welding electrodes are conventionally required to make such connections. Accordingly, it would be desirable to provide method and apparatus for making connections that reliably withstand the above mentioned and other adverse conditions and yet that do not necessitate the use of means utilized heretofore, e.g., conventional welding electrodes. This would be especially desirable for applications that require the connection of a relatively hard to solder material, such as aluminum; to another aluminum or a copper conductor; and particularly so when the aluminum conductor is relatively small "magnet wire."

SUMMARY OF THE INVENTION

Accordingly, an object of the present invention is to provide improved methods and apparatus for making a strong mechanical connection between two electrical conductors having a low electrical resistance.

Another object of the present invention is to provide methods and apparatus for making an electrical connection between two electrical conductors by welding them together without the use of welding electrodes.

Still another object of the invention is to provide methods and apparatus wherein an arc between at least two spaced apart segments of a first electrical conductor is utilized for joining at least a portion of a second electrical conductor to at least one of the two spaced apart segments and thereby making a strong, reliable, heat resistant electrical connection between the two conductors.

A further object of the present invention is to provide methods and apparatus for joining two conductors, wherein the conductors are placed in a gap between portions of a fixture conductor and connected together to form a strong electrical connection therebetween by an arc that is established by applying a predetermined voltage across at least those portions of the fixture conductor that establish the gap.

A still further object of the invention is to provide methods and apparatus for making an electrical connection between a stranded lead wire and a solid magnet wire, wherein: two loops are formed in an electrical conductor, the lead wire is placed between adjacent portions of one loop, the magnet wire is placed between adjacent portions of the other loop, and a current is caused to flow through the conductor to produce an arc across the adjacent portions of each loop, so as to join both wires to the electrical conductor and to make an electrical connection between the two wires.

In carrying out the invention in one form, I provide an improved method for joining together two conductors that includes forming at least one electric current conducting circuit, so that at least one pair of spaced apart portions along a predetermined segment of a first conductor, separated by an intervening or intermediate portion of the conductor, are positioned adjacent to one another, e.g., by forming a loop in such segment; relatively positioning a preselected segment of a second conductor and the adjacent portions of the predetermined segment of the first conductor so that the preselected segment is located between the pair of spaced apart portions; and causing electric current to flow through at least the predetermined segment of the first conductor so that an arc between the pair of spaced apart portions is produced and the preselected segment of the first conductor is thereby welded to the second conductor. In another form, a preselected length (or segment) of a third conductor is positioned adjacent to the preselected segment of the first conductor and the second and third conductors are joined together, e.g., by welding, by the arc. In still other forms, one or more preselected segments of a second conductor are arranged in a looped or doubled back configuration and one or more spaced apart loops of a first conductor are utilized to interconnect preselected ones of the conductors. Each of the conductors may be stranded or solid in form.

According to another aspect of the invention, exemplified apparatus includes a conducting loop fixture and means for causing current to flow through the loop fixture so that an arc is struck between adjacent portions of the fixture for utilization in electrically and mechanically connecting two or more conductor segments.

The subject matter which I regard as my invention is particularly pointed out and distinctly claimed in the concluding portion of this specification. My invention itself, however, both as to its organization and method of operation, together with further objects and advantages thereof, may best be understood by reference to the following description taken in connection with the accompanying drawings wherein like reference numerals have been used to designate similar parts or components.

DESCRIPTION OF THE PREFERRED EMBODIMENTS

Figure 1:
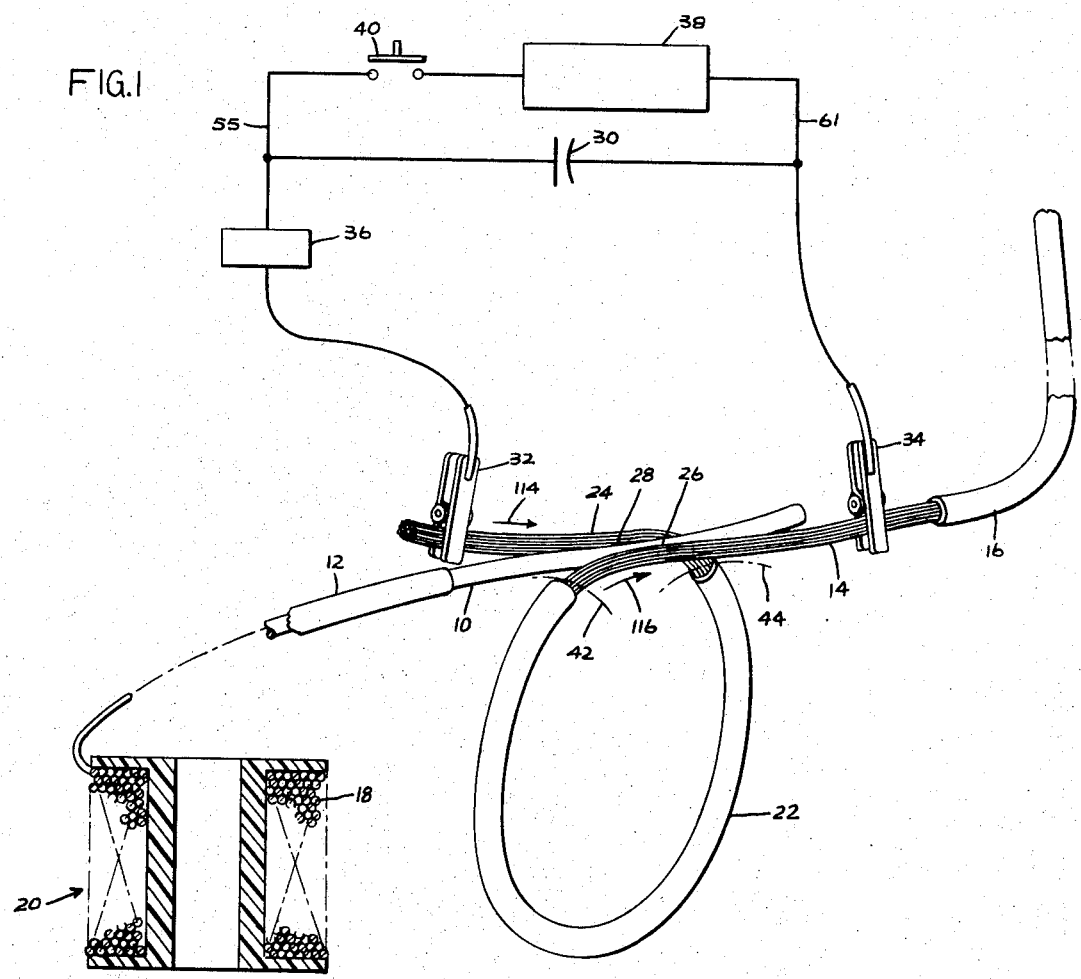
FIG. 1 schematically illustrates both method and apparatus, in preferred forms thereof, that may be utilized in the practice of the invention.

FIG. 1 illustrates the practice of the invention in one form thereof and an exemplary form of apparatus whereby a solid magnet wire 10 having an enameled insulating coating 12 is joined (e.g., electrically and mechanically connected) to a stranded lead wire 14 of copper or aluminum having an insulating covering 16. The magnet wire 10 typically may be a lead end of a winding or coil 18 of an electromagnetic device 20, such as a transformer, motor, relay, etc. The wire 10 may be copper or other less readily solderable material, such as aluminum, whereby even greater benefits and advantages resulting from utilization of the invention may be obtained.

As illustrated in FIG. 1, the lead wire 14 is doubled up or back on itself so that stripped portions 24 and 26 of wire 14 are adjacent to each other and substantially parallel to each other at the top of a loop 22. The loop 22 and other loops referred to herein have been shown for illustration purposes as being generally circular in configuration. A portion 28 of the magnet wire 10 from which the insulation 12 has been stripped is placed between the adjacent parallel loop portions 24 and 26 of the lead wire 14.

In order electrically and mechanically to connect together the lead 14 and the magnet wire 10, a charged capacitor 30 is connected by means of suitable clamps 32 and 34 to portions of the lead wire 14 so that the portions 24 and 26 as well as the loop 22 establish an electrical circuit between the clamps. A suitable switching means, such as an ignitron 36, is connected between one side of capacitor 30 and the clamp 32, for example. Ignitron is normally nonconducting, but when the voltage of capacitor 30 is sufficiently high to fire the ignitron, a high capacitor discharge current passes through the ignitron, lead wire portion 24, loop 22, lead wire portion 26, and clamp 34 back to the other side of the capacitor. When the discharge current is sufficiently high, an arc is struck across the relatively low resistance path formed by the portions 24 and 26 of the lead wire and the stripped magnet wire portion 28, thereby causing the magnet wire portion 28 to become welded to both loop portions 24 and 26. After the weld is made, the excess portion of lead wire 14 is preferably removed by severing lead wire 14 at the points indicated by broken lines 42 and 44 in the portion of the loop intermediate the portions 24, 26.

When the discharge current falls to a predetermined level, the ignitron once again becomes nonconducting. A d.c. voltage source 38 may be connected across capacitor 30 through a suitable switch 40 to recharge capacitor 30 after each welding operation. It will be understood that the ignitron, switch, capacitor bank or capacitor 30, and d.c. voltage source 38 may be any suitable type known heretofore. For example, suitable elements and an energy source that may be used are particularly described in Rushing U.S. Pat. No. 3,333,328, assigned to the assignee of this application. Accordingly, the entire disclosure of said Rushing patent is specifically incorporated herein by reference.

I have found that there is a tendency for portion 28 of the solid magnet wire 10 to become welded to individual strands of the stranded lead wire 14. Even though these welds are quite acceptable for aluminum magnet wire and a lead wire of relatively few copper strands, e.g., no. 18 wire with 16 strands of 0.010 inch diameter wire, it appears that the breaking strength of the connection is lower and the contact resistance higher for lead wires with finer strands. However, I have found that I can obtain lower contact resistance for any given size and number of strands by forming a loop in the solid magnet wire and placing a looped end of the stranded lead wire between and substantially perpendicular to two spaced apart parallel loop portions of the magnet wire loop so that the stranded lead wire is welded at two different points to the magnet wire, as shown in FIG. 2.

Figure 2:
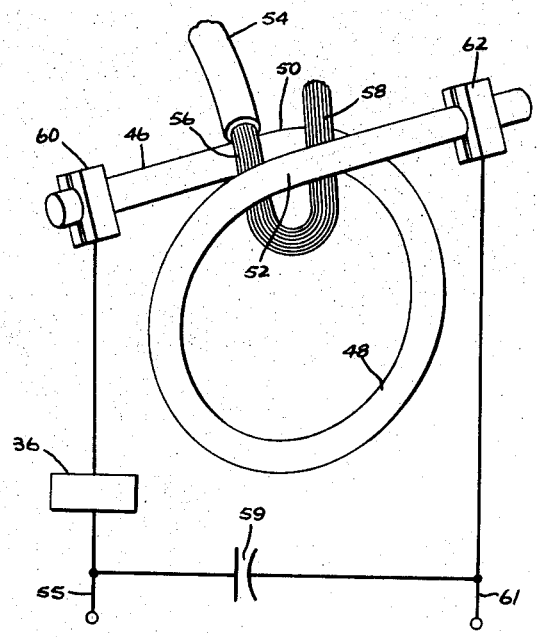
FIGS. 2–5 each schematically depict other forms of methods and apparatus, or parts thereof, that may be utilized in the practice of the invention.
Figure 3:
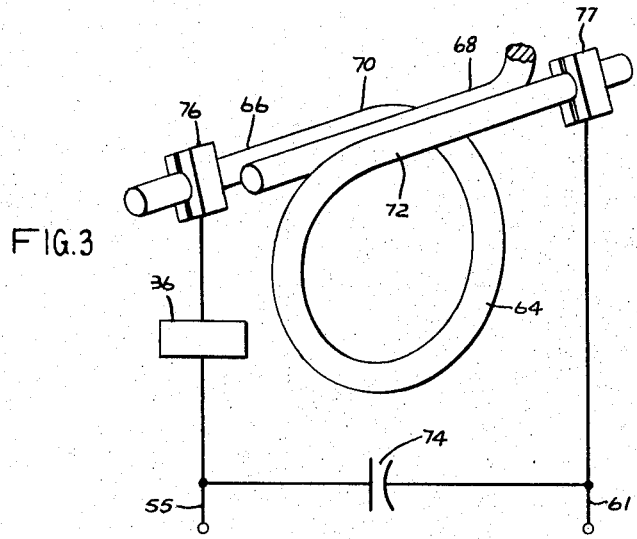

In FIG. 2, a stripped end of a solid aluminum magnet wire 46 is doubled up and thus forms a loop 48 having two adjacent and substantially parallel loop portions 50 and 52 separated by an intervening portion as illustrated. The stripped end of a stranded copper lead wire 54 is also doubled back, e.g., formed into a loop having two portions 56 and 58 which are placed between the parallel portions 50 and 52 of the magnet wire 46, so that both portions of the lead wire are substantially perpendicular to the parallel loop portions 50 and 52 of the magnet wire. It will be understood, that the broken piece of magnet wire 46 (as well as the magnet wire hereinafter mentioned in connection with FIGS. 3–5) may be the lead end of a winding for an inductive device.

A capacitor 59 (charged from a source as described hereinabove through leads 55, 61) is connected by means of clamps 60 and 62 across the magnet wire 46 as shown. The capacitor discharge current then causes an arc to be struck between the loop portions 50 and 52 through both of the lead wire portions 56 and 58, thereby welding both of the lead wire loop portions to both of the magnet wire loop portions. Even though the strands of lead wire 54 were tinned, a condition which makes welding more difficult, a very acceptable connection was made. It was found that mechanically stronger connections were obtained when the solid magnet wire was also copper, rather than aluminum.

Even better results are obtained when both of the wires to be joined are solid conductors. For example, in FIG. 3, a loop 64 is formed in a segment of stripped solid conductor 66, and a segment of another stripped solid conductor 68 is placed between and substantially parallel to the generally parallel portions 70 and 72 of the conductor 66. Again, a capacitor 74, charged by suitable means, is connected to portions of the conductor 66 by suitable devices such as clamps 76 and 77, so that upon discharge of the capacitor 74, a high current passes through the loop 64 and an arc is struck between the loop portions 70 and 72 and through the conductor 68, thereby welding the conductor 68 to both of the loop portions 70 and 72 of the conductor 66.

Figure 4:
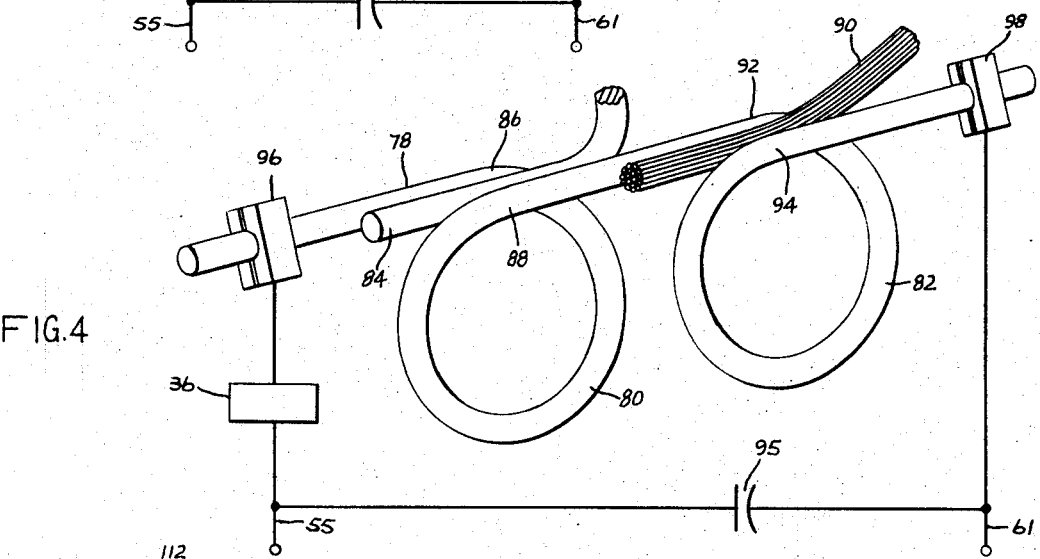

FIG. 4 illustrates still another embodiment that is particularly suitable for joining a solid aluminum magnet wire to a copper lead wire more finely stranded than the wire 14 discussed above. In this figure, a segment of stripped solid copper conductor 78 is formed with two loop portions 80 and 82. A lead end of a solid aluminum magnet wire 84 from a transformer, motor, or other inductive device winding is placed between the closely spaced substantially parallel portions 86 and 88 of the loop 80 as illustrated. In like manner, the stripped end of a stranded copper lead wire 90 is placed between the portions 92 and 94 of the loop 82. A capacitor 95, charged as before, is then connected by means of suitable clamps 96 and 98 to the opposite ends of conductor 78. When the capacitor discharges, upon firing of an ignitron as described above, a high current flows through the copper conductor 78 and through the loops 80 and 82, thereby causing arcs to be struck between the portions 86 and 88, and between the portions 90 and 92. Thus, the magnet wire 84 is welded to both of the portions 86 and 88 and the lead wire 90 is welded to both of the portions 92 and 94. After the weld is completed, the excess portion of loops 80 and 82 are removed in the same manner as described hereinabove, leaving the solid aluminum magnet wire 84 mechanically and electrically connected to stranded copper lead wire 90 via the external solid copper conductor 78. If desired, the stranded copper lead wire 90 and solid copper conductor 78 may be soldered in conventional manner.

Figure 5:
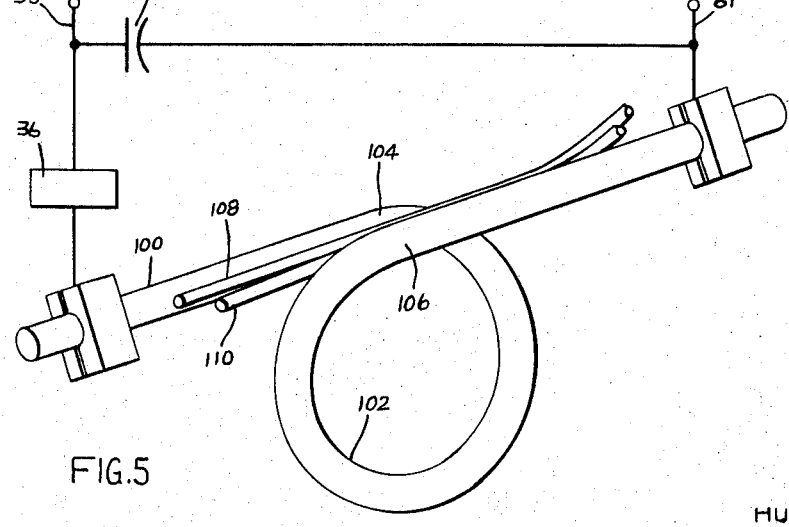

FIG. 5 illustrates yet another embodiment of the invention. A relatively large diameter, solid copper fixture conductor 100 is provided with a doubled back or loop portion 102 having adjacent and substantially parallel portions 104 and 106. Segments of two conductors 108 and 110 which are to be mechanically and electrically connected together are then placed between loop portions 104 and 106 so that the conductors are substantially parallel to each other and to the loop portions. A capacitor 112 (charged as before) is connected across the ends of the fixture conductor 100. The capacitor discharge current flowing through fixture conductor 100 and a conducting ignitron or other conducting switching means when used, causes an arc to be struck across portions 104 and 106 and through conductors 108 and 110, thereby welding together the conductors 108 and 110. It should be noted that in this embodiment, conductors 108 and 110 may tend to be welded to the fixture conductor 100.

Although the foregoing embodiments have been primarily described as directed to the problem of electrically connecting a solid aluminum conductor to a stranded or solid copper lead conductor, it will be understood that the aluminum conductor may also be stranded. In addition, the invention may be utilized to electrically connect two aluminum conductors and/or two copper conductors, whether one or both are solid or stranded. It should also again be noted that, even though the drawings illustrate a circular loop, the particular geometrical configuration or shape is not critical and, thus, a loop having a square or other shape may be used. Moreover, the intermediate or intervening portion in each loop may be removed, if desired, after connection is completed.

It has also been found that the substantially parallel portions of each of the loops are magnetically attracted to each other by virtue of the current flowing through the loop conductor. For example, arrows 114 and 116 in FIG. 1 show that the current flows in both loop portions 24 and 26 in the same direction, thereby producing a magnetic attraction between the loop portions to bring them into physical contact with the magnet wire portion 28, and thereby effecting a better weld.

While practicing the invention in accordance with each of the above described exemplifications, slight physical contact was maintained between the parallel portions of a loop conductor or loop fixture and a conductor segment to be welded to permit an arc to be established. However, such contact must not be so great that the resistance from one loop portion to another through the conductor segment becomes so low that an arc is not established. For example, I have found that if the parallel loop portions are tightly clamped against the conductor segment, an arc may not be struck. Accordingly, when one or more conductor segments and/or a loop conductor are to be held in a fixture, it is desirable that clamp or holding means not be applied to the overlapping portions of the loop and that the contact between the conductors be maintained by the tension that exists in the loop.

With slight contact established, as a surge of current is flowed through the loop, at least some slight amount of relative movement takes place between the conductors and the parallel portions of the loop. It is believed that this slight relative movement assists in establishing the arc which effects the desired welding of the conductors.

It is also noted that the actual resistance of the intervening or intermediate portions of the loop conductors does not appear to have a significant affect upon the results obtained from any given loop conductor. However, the provision of at least relatively short portions that are parallel to one another is desirable because the resultant magnetic forces that are caused by current flow through the loop tend to move the two parallel portions together and clamp the conductor segments between the parallel loop portions as the arc is struck.

Significant differences in results have not been observed when the actual size or dimension of the loop and adjacent parallel loop portions have been varied. However, in each of the exemplifications, for ease of handling, the length of each of the parallel spaced apart portions (for example, parallel portions 24 and 26) was about one-quarter of the total perimeter measurement of the loop. For example, square loops were formed having a generally square configuration with a dimension of about 1 ½ inches per side, thus utilizing a total of about 7 ½ inches of conductor in the overlapped loop. Thus, each of the parallel loop conductors were about 1 ½ inches long as were the other three sides of the loop. Similarly, when the loop was formed as a circular loop, its diameter was about 2 inches (and it therefore had a circumference of about 6 inches). In these cases, I provided adjacent parallel portions each having a length of about 1 ½ inches. It should again be specifically noted however that the actual diameter or other characteristic dimension of the loop is selected for convenience of use and that satisfactory results have been achieved with loops having a circumference of about 2 feet.

With specific reference to the exemplification shown in FIG. 5, both circular and rectangular loop fixtures have been utilized having various dimensions. These may be made of copper or aluminum. Moreover, the conductor may be round or rectangular. For example, satisfactory results have been obtained while utilizing a 3 inch square copper conductor; and while utilizing a 0.09 inch by 0.160 inch rectangular copper conductor with the loop arranged so that the wider dimension (0.160 of an inch) of the parallel loop portions were facing one another. When a rectangular loop fixture is used it is generally preferable for the larger dimension of the loop conductors in the parallel portions thereof to be facing one another so that a greater contact area is achieved. In all of the exemplifications, because of the voltages applied to the conductors, enclosures or other means should be used to prevent inadvertent manual contact with the conductors during the time that voltage is applied thereto.

As previously mentioned, both copper and aluminum magnet wire of various sizes have been satisfactorily joined together by practicing the invention. For example, copper magnet wire available in sizes in the range from 10 mils to 90 mils have been connected. Aluminum magnet wire, available in sizes from 20 mils to approximately 70 mils have also been connected with satisfactory results. The criteria that was utilized in order to determine whether satisfactory joints were obtained was the joint or connection resistance. This was determined by measuring the resistance of the joints as will be understood. A joint or connection resistance of 0.5 milliohm was used as an indicia of acceptance. Thus, if the joint resistance was greater than one-half milliohm, the joint or connection was considered to be unacceptable. On the other hand, if the joint or connection resistance was less than one-half milliohm, the connection was acceptable. Many of the joints that were formed according to the above described exemplifications were acceptable and had a measureable contact resistance of 10 or less micro-ohms.

For purposes of complete description, it is also noted that the power supply used was capable of charging the capacitors utilized to above 1,000 volts. Moreover, the cycle time of the power supply was adjustable so that the machine could be set to automatically discharge the capacitor, i.e., fire the ignitron, after a desired interval of time, measured from the time that the power supply was first energized (e.g., by closing switch 40 in FIG. 1).

In all of the exemplifications, the capacitor means comprised a capacitor bank that included six 205 microfarad capacitors connected in parallel with one another, each of the capacitors having a rated voltage of 5,000 volts. Thus, the capacitor bank utilized had a total capacitance of about 1,230 microfarads with a rated voltage of about 5,000 volts.

In the practice of the invention as exemplified hereinabove, the capacitor means were charged to voltages varying from about 300 volts to approximately 1,000 volts, depending upon the size of the conductors to be connected. For example, when the loop was formed from magnet wire and the conductor disposed between adjacent parallel loop portions was a stranded conductor as described hereinabove, the capacitor bank could be charged to as high as about 980 or 1,000 volts and satisfactory results could still be obtained. The satisfactory results, of course, could be determined by measuring the connection or joint resistance as described above. Thus an optimized voltage setting for the capacitor means was readily determined for any given particular combination of materials and material sizes used in any given set of trials.

As a general guideline, I have found that if good results are obtained by charging the capacitor to about 500 volts, use of higher voltages would result in more connections being broken or burned. However, at voltages less than the optimum level, connections either would not be made at all, or the connections would have a resistance higher than the acceptable level of one-half milliohm per joint or connection. The discharge of the capacitor means through the ignitron was relatively rapid in all cases and the rise time of the current through the loop (that is, the elapsed time after initial conduction of the ignitron to the time that the current flowing through the loop reached a peak value) was about 50 microseconds. Thus, assuming that the current decay time would be also about 50 microseconds, and that the rise time and fall (or decay) time would occur in a one-half cycle of operation of about 100 microseconds, a full cycle could then be said to occur in about 200 microseconds. Based on this, the frequency or discharge rate was about 0.005 hertz. The particular ignitron used was a General Electric type GL7171, but as will be understood, other available high current switching means could also be used, it being noted that the peak current flow typically was on the order of about 10,000 to 12,000 amperes when the capacitor discharge voltage was about 470 volts.

While in accordance with the patent statutes I have described what at present are considered to be preferred and alternate embodiments of my invention, it will be obvious to those skilled in the art that numerous changes and modifications may be made therein without departing from the invention, and it is therefore aimed in the appended claims to cover all such equivalent variations as fall within the true scope and spirit of the invention.

What I claim as new and desire to secure by Letters Patent of the United States is:

1. A method of making an electrical connection between at least two electrical conductors comprising the steps of: arranging a segment of a first conductor so that at least two portions of the first conductor, separated by an intermediate portion of the first conductor, are adjacent to one another; relatively positioning the at least two portions of the first conductor and a preselected portion of a segment of a second conductor so that the preselected portion is between the at least two portions of the first conductor; and causing electric current to flow through the first conductor so that an arc is produced between the two adjacent portions thereof and through the second conductor, whereby the preselected portion of the segment of the second conductor is joined to the two portions of the first conductor.

2. A method as defined in claim 1 further comprising relatively orienting the at least two portions of the first conductor and the preselected portion of the segment of the second conductor so that they are in substantially parallel alignment and at least slightly contacting the segment of the second conductor by said at least two portions of the first conductor prior to causing electric current to flow through the first conductor.

3. A method as set forth in claim 1 further comprising removing at least a portion of the intermediate portion of the first conductor between the at least two portions thereof after the first and second conductor have been joined together.

4. A method as set forth in claim 1 further comprising placing at least two portions of the second conductor between the at least two portions of the first conductor.

5. A method of forming an electrical connection between at least two conductors comprising the steps of: relatively positioning the at least two conductors and a third conductor so that each of the at least two conductors are located between two adjacent and approximately parallel portions of a third conductor; causing electrical current to flow through the third conductor so that an arc is struck between adjacent portions of the third conductor and so that each of the at least two conductors are subjected to an arc formed between a pair of adjacent portions of the third conductor and magnetically clamped thereby whereby the at least two conductors are electrically connected by a weld formed by the arc to which each of the at least two conductors are subjected.

6. The method of claim 6 further comprising: forming at least two loops in the third conductor so that a first two portions of the third conductor, separated by a first intervening portion of the third conductor, are adjacent to one another and so that a second two portions of the third conductor, separated by a second intervening portion of the third conductor, are adjacent to one another, with the first and second loops being interconnected by a third intervening portion of the third conductor; and welding first and second ones of the at least two conductors to the first and second loops, respectively, by causing electrical current to flow through at least the first two and second two portions of the third conductor.

7. The method of claim 6 further comprising the step of severing at least part of the first and second intervening portions of the third conductor after the at least two conductors are connected to the third conductor.

8. Apparatus for making an electrical connection between two electrical conductors comprising: a first electrical conductor having at least one loop formed therein and containing two adjacent portions of said first conductor; and means for causing current to flow through said first conductor to produce an arc between said adjacent portions thereby to weld at least one other conductor positioned between said adjacent portions and to establish a welded electrical connection for the at least one other conductor.

9. The apparatus of claim 8 wherein said means for causing current to flow includes a charged capacitor connected across said loop; and means for discharging said capacitor through said loop to produce the arc.

10. The apparatus of claim 9 wherein the first electrical conductor comprises at least one solid copper conductor and the two adjacent portions thereof are at least approximately parallel to one another and closely spaced whereby to hold and contact a segment of the at least one other conductor while it is positioned therebetween.

* * * * *